(12) United States Patent
Jesus et al.

(10) Patent No.: US 11,734,612 B2
(45) Date of Patent: Aug. 22, 2023

(54) OBTAINING A GENERATED DATASET WITH A PREDETERMINED BIAS FOR EVALUATING ALGORITHMIC FAIRNESS OF A MACHINE LEARNING MODEL

(71) Applicant: Feedzai—Consultadoria e Inovação Tecnológica, S.A., Coimbra (PT)

(72) Inventors: Sérgio Gabriel Pontes Jesus, Gondomar (PT); Duarte Miguel Rodrigues dos Santos Marques Alves, Lisbon (PT); José Maria Pereira Rosa Correia Pombal, Lisbon (PT); André Miguel Ferreira Da Cruz, Vila do Conde (PT); João António Sobral Leite Veiga, Lisbon (PT); João Guilherme Simões Bravo Ferreira, Lisbon (PT); Catarina Garcia Belém, Seixal (PT); Marco Oliveira Pena Sampaio, Vila Nova de Gaia (PT); Pedro Dos Santos Saleiro, Lisbon (PT); Pedro Gustavo Santos Rodrigues Bizarro, Lisbon (PT)

(73) Assignee: Feedzai—Consultadoria e Inovação Tecnológica S.A.

( * ) Notice: Subject to any disclaimer, the term of this patent is extended or adjusted under 35 U.S.C. 154(b) by 0 days.

(21) Appl. No.: 17/855,323

(22) Filed: Jun. 30, 2022

(65) Prior Publication Data
US 2023/0074606 A1  Mar. 9, 2023

Related U.S. Application Data

(60) Provisional application No. 63/237,961, filed on Aug. 27, 2021.

(30) Foreign Application Priority Data

May 26, 2022  (EP) .................................. 22175664

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

2021/0406712 A1* 12/2021 Bhide ...................... G06N 3/08

OTHER PUBLICATIONS

Pessach, Dana, and Erez Shmueli. "Algorithmic fairness." arXiv preprint arXiv:2001.09784 (2020). (Year: 2020).*

(Continued)

*Primary Examiner* — Daniel T Pellett
(74) *Attorney, Agent, or Firm* — Van Pelt, Yi & James LLP

(57) ABSTRACT

In various embodiments, a process for obtaining a generated dataset with a predetermined bias for evaluating algorithmic fairness of a machine learning model includes receiving an input dataset and generating an anonymized reconstructed dataset based at least on the input dataset. The process includes introducing a predetermined bias into the generated dataset, forming an evaluation dataset based at least on the generated dataset with the predetermined bias, and outputting the evaluation dataset. In various embodiments, a process for training a generative model includes configuring a generative model and receiving training data, where the training data includes a tabular dataset. The process includes using computer processor(s) and the received training data to train the generative model, where the generative model is sampled to generate a dataset with a predetermined bias.

20 Claims, 6 Drawing Sheets

(56) References Cited

OTHER PUBLICATIONS

Da Cruz, André Miguel Ferreira. "Fairness-Aware Hyperparameter Optimization." (2020). (Year: 2020).*

Nakajima, Shin, and Tsong Yueh Chen. "Generating biased dataset for metamorphic testing of machine learning programs." IFIP International Conference on Testing Software and Systems. Springer, Cham, 2019. (Year: 2019).*

Abusitta, Adel, Esma Aïmeur, and Omar Abdel Wahab. "Generative adversarial networks for mitigating biases in machine learning systems." arXiv:preprint arXiv: 1905.09972 (2019). (Year: 2019).*

Poulis, Giorgos, et al. "Secreta: A tool for anonymizing relational, transaction and rt-datasets." Medical data privacy handbook. Springer, Cham, 2015. 83-109. (Year: 2015).*

Agarwal et al., A Reductions Approach to Fair Classification, Proceedings of the 35th International Conference on Machine Learning, Stockholm, Sweden, 2018.

Ali Borji, Pros and Cons of GAN Evaluation Measures, Journal of Computer Vision and Image Understanding, Oct. 25, 2018.

Angwin et al., Machine Bias: There's software used across the country to predict future criminals. And it's biased against blacks, ProPublica, pp. 1-26, May 23, 2016.

Bao et al., It's COMPASlicated: The Messy Relationship between RAI Datasets and Algorithmic Fairness Benchmarks, 35th Conference on Neural Information Processing Systems, 2021.

Bellamy et al., AI Fairness 360: An Extensible Toolkit for Detecting, Understanding, and Mitigating Unwanted Algorithmic Bias, Retrieved from arXiv:1810.01943v1, Oct. 3, 2018.

Blanzeisky et al., Algorithmic Factors Influencing Bias in Machine Learning, University College Dublin, Retrieved from arXiv:2104.14014v1, Apr. 28, 2021.

Chen et al., XGBoost: A Scalable Tree Boosting System, KDD '16, Aug. 13-17, 2016, 785-794, San Francisco, CA, USA.

Cotter et al., "Optimization with Non-Differentiable Constraints with Applications to Fairness, Recall, Churn, and Other Goals", Journal of Machine Learning Research 20 (2019) 1-59, Published Nov. 2019.

Cotter et al., "Two-Player Games for Efficient Non-Convex Constrained Optimization", Proceedings of Machine Learning Research vol. 98:1-33, 2019.

Cruz et al., Promoting Fairness through Hyperparameter Optimization, 21st IEEE International Conference on Data Mining, 2021.

Ding et al., Retiring Adult: New Datasets for Fair Machine Learning, 35th Conference on Neural Information Processing Systems, 2021.

Donini et al., Empirical Risk Minimization Under Fairness Constraints, 32nd Conference on Neural Information Processing Systems, pp. 1-11, 2018.

Dua et al., UCI Machine Learning Repository, http://archive.ics.uci.edu/ml, Irvine, CA: University of California, School of Information and Computer Science, 2019.

Friedler et al., A Comparative Study of Fairness-Enhancing Interventions in Machine Learning, pp. 1-22, Feb. 13, 2018.

Hardt et al., Equality of Opportunity in Supervised Learning, 30th Conference on Neural Information Processing Systems, pp. 1-9, 2016.

Ke et al., LightGBM: A Highly Efficient Gradient Boosting Decision Tree, 31st Conference on Neural Information Processing Systems (NIPS 2017), Long Beach, CA, USA.

Mehrabi et al., A Survey on Bias and Fairness in Machine Learning, Retrieved from arXiv:1908.09635v3, pp. 1-34, Jan. 25, 2022.

Meier et al., What Happened in Hazelwood: Statistics, Employment Discrimination, and the 80% Rule, American Bar Foundation, pp. 139-186, 1984.

Menon et al., The Cost of Fairness in Binary Classification, Proceedings of Machine Learning Research 81, pp. 1-12, 2018.

Merler et al., Diversity in Faces, IBM Research AI, pp. 1-29, Retrieved from arXiv:1901.10436v6, April 8, 2019.

Mirza et al., Conditional Generative Adversarial Nets, Retrieved from arXiv:1411.1784v1, pp. 1-7, Nov. 6, 2014.

Narasimhan et al., Optimizing Generalized Rate Metrics with Three Players, 33rd Conference on Neural Information Processing Systems (NeurIPS 2019).

Pleiss et al., On Fairness and Calibration, 31st Conference on Neural Information Processing Systems, pp. 1-10, 2017.

Saleiro et al., Aequitas: A Bias and Fairness Audit Toolkit, University of Chicago, pp. 1-19, 2018.

Saleiro et al., Dealing with Bias and Fairness in Data Science Systems: A Practical Hands-on Tutorial, KDD, pp. 3513-3514, Aug. 23-27, 2020.

Stanovsky et al., Evaluating Gender Bias in Machine Translation, Proceedings of the 57th Annual Meeting of the Association for Computational Linguistics, pp. 1679-1684, 2019.

Supreme Court of the United States, *Ricci* v. *Destefano*, 2009.

Xu et al., Modeling Tabular Data Using Conditional GAN, 33rd Conference on Neural Information Processing Systems. pp. 1-11, 2019.

Zafar et al., Fairness Constraints: Mechanisms for Fair Classification, Proceedings of the 20th International Conference on Artificial Intelligence and Statistics, 2017.

Zhao et al., CTAB-GAN: Effective Table Data Synthesizing, Proceedings of Machine Learning Research 157, 2021.

Aditya Kunar: "Effective and Privacy preserving Tabular Data Synthesizing", arxiv.org, Cornell University Library, 201 Olin Library Cornell University Ithaca, NY 14853, Aug. 11, 2021 (Aug. 28, 2021), XP091036932.

Fan et al: "Relational Data Synthesis using Generative Adversarial Networks: A Design Space Exploration", arxiv.org, Cornell University Library, 201 Olin Library Cornell University Ithaca, NY 14853, Aug. 28, 2020 (Aug. 28, 2020), XP081750021.

Park et al.: "Data Synthesis based on Generative Adversarial Networks", arxiv.org, Cornell University Library, 201 Olin Library Cornell University Ithaca, NY 14853, Jun. 9, 2018 (Jun. 9, 2018), XP081242026, DOI: 10.14778/3231751.3231757.

* cited by examiner

OBTAINING A GENERATED DATASET WITH A PREDETERMINED BIAS FOR EVALUATING ALGORITHMIC FAIRNESS OF A MACHINE LEARNING MODEL

CROSS REFERENCE TO OTHER APPLICATIONS

This application claims priority to U.S. Provisional Patent Application No. 63/237,961 entitled SYSTEM TO GENERATE DATASETS TO TEST FAIRNESS OF MACHINE LEARNING MODELS filed Aug. 27, 2021, which is incorporated herein by reference for all purposes.

This application claims priority to European Patent Application No. 22175664.6 entitled METHOD AND DEVICE FOR OBTAINING A GENERATED DATASET WITH A PREDETERMINED BIAS FOR EVALUATING ALGORITHMIC FAIRNESS OF A MACHINE LEARNING MODEL filed May 26, 2022, which is incorporated herein by reference for all purposes.

BACKGROUND OF THE INVENTION

Computer programs including machine learning systems are typically evaluated with respect to both fairness and predictive accuracy when they are being developed or improved. Evaluation remains an obstacle to progress for Fairness in Machine Learning (Fair ML) because of a lack of consistent, well-established, and systematic evaluation of fairness; and scarcity of realistic, large tabular datasets for algorithmic decision-making; among other things.

BRIEF DESCRIPTION OF THE DRAWINGS

Various embodiments of the invention are disclosed in the following detailed description and the accompanying drawings.

DETAILED DESCRIPTION

Figure 1A:
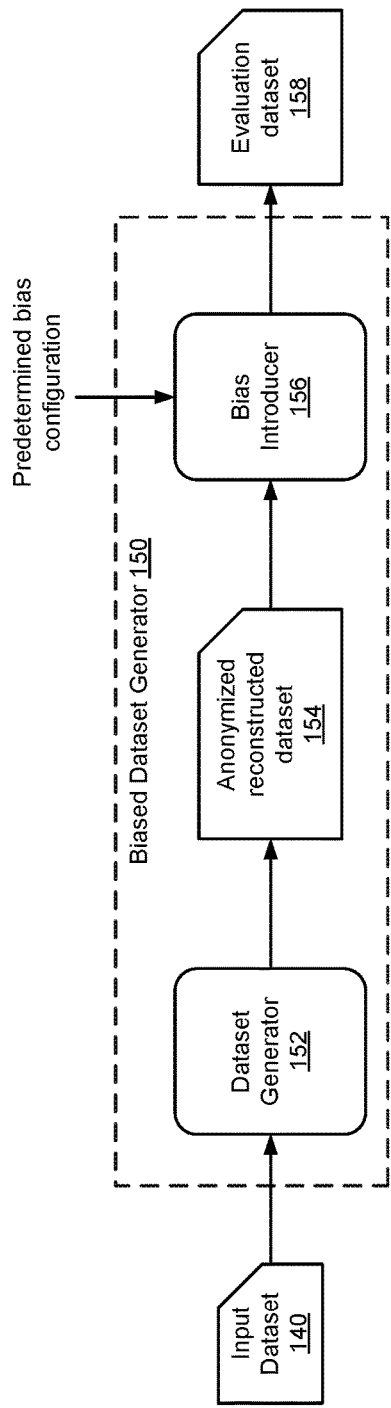
FIG. 1A shows a schematic representation of an embodiment of a system for generating an evaluation dataset that is biased and optionally anonymized.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Fairness in Machine learning (ML) has been a vibrant research topic in recent years, with several works laying theoretical groundwork, metric trade-offs and incompatibilities. Nonetheless, there has not been a major breakthrough in the field and real-world adoption of bias mitigation methods is still scarce.

Evaluation remains an obstacle to progress in fair ML because of a lack of consistent, well-established, and systematic evaluation of fairness; and scarcity of realistic, large tabular datasets for algorithmic decision-making; among other things.

Inconsistent evaluation practices cast doubt on the utility of novel fair ML methods. The choice of prior art datasets for fairness studies has been usually based on the few datasets that were used on seminal works. However, the choice of tabular datasets typically depends only on two requirements: a) public availability and b) inclusion of protected attributes (or, interchangeably, sensitive attributes), to calculate fairness metrics. However, common datasets such as Correctional Offender Management Profiling for Alternative Sanctions (COMPAS) and the Adult dataset from the University of California at Irvine (UCI Adult dataset) are small, representing easy but unrealistic predictive tasks.

Fair ML can be highly problem-specific, entailing many decisions, e.g., fairness and performance metrics, group membership, models, thresholds, and, thus, potentially different and incomparable results. Models are evaluated with undisclosed decision thresholds, on different fairness and performance metrics, at times with no consideration for the different types of underlying biases or intervention (i.e., actions derived from model predictions).

Evaluating both fairness and predictive accuracy is typically practiced when introducing novel algorithms, methods, or metrics for bias mitigation.

Most works define fairness metrics irrespective of the use case and with no considerations for the practical impact to end users, e.g., whether the task is punitive or assistive. Additionally, inconsistency in metrics choice is an obstacle to research progress, rendering any comparison between different methods unreliable.

Thirdly, reports of model performance generally refer to a single operating point, i.e., a single threshold which, in many cases, is not disclosed. Despite being simple, this can be an important aspect to ensuring comparability and reproducibility. In a similar view, many works, including benchmarks, often focus their analysis on a narrow subset of bias intervention, such as the pre-processing interventions, thus failing to provide the overall comparison of different intervention types for each specific task.

Most efforts on dataset building concern Computer Vision tasks, e.g., facial analysis or medical diagnosis, or Natural Language Processing ones, e.g., co-reference resolution and machine translation, with little to no recent development on algorithmic decision-making tabular tasks. In the presence of inadequate tabular datasets, it is relevant to create a test bed made of diverse, robust, and realistic datasets, reflecting real-world discriminatory patterns.

One potential obstacle to sharing real-world datasets is the privacy and anonymization of data, especially in sensitive areas like healthcare and finance. Removing personal information from data records is a risky and time-consuming task. To circumvent this limitation, one can use generative approaches, for instance, Generative Adversarial Networks (GANs), to create anonymized replicas of real-world datasets. However, GANs are not typically disclosed in the context of bias evaluation.

Another privacy-preserving approach is CTGAN. This method employs a conditional based GAN architecture that generates datasets with continuous, categorical, or binary features. It processes unbalanced categorical features by oversampling values with low frequencies and handles non-Gaussian continuous features by using a Variational Gaussian Mixtures Model. This architecture can be easily extended for case-specific constraints, such as numerical features with upper and lower bounds.

The evaluation of GANs is performed at the level of the generated sample, i.e., the output of the GAN model. This evaluation is typically performed in two different characteristics of the dataset: a) predictive performance on the generated data, and b) statistical similarity to the seed dataset.

During the evaluation of predictive performance, one checks how the original ML performance changes, when part of the original dataset is replaced by its generated counterpart.

Despite the large number of existing datasets in the fairness literature, the most popular ones are too small in size, less than 10K rows, and simplistic in nature. As a case in point, over 90% test precision can be achieved for fair models on the UCI Adult dataset with a basic LightGBM algorithm. Other datasets such as COMPAS, German Credit, and Ricci have respectively 6K, 1K, and 118 rows, and are therefore limited in size. Methods suited for these small simpler datasets may not be suited for larger, more complex datasets. In addition to dataset size, another criterion for including a dataset as a benchmark is that of the data being in tabular format, and the existence of a protected attribute column.

It may be relevant to evaluate models and bias mitigation techniques beyond the bias that naturally occur in datasets (e.g., to artificially inject predefined types of bias into the dataset). This provides fine-grained control over experiments and increases the overall robustness of a benchmark. Robustness refers to resistance to different bias patterns in data.

There are several definitions of bias in data, but there is still little consensus on how to measure it, or their impact on algorithms' predictive performance and fairness.

For example, three different types of bias related to a given protected attribute can be defined as: (i) group size disparities, (ii) prevalence disparities, and (iii) distinct conditional class separability.

Group size disparity is given by $$\exists\, a \in A\colon P[A = a] \neq \frac{1}{N},$$

where a represents a single group from a given protected attribute A, and N the number of possible groups. This results in different frequencies for possible values of the protected attribute.

Prevalence disparity occurs when $P[Y] \neq P[Y|A]$, i.e., the class probability is dependent on the protected group.

Distinct conditional class separability extends the previous definition by including the joint distribution of input features X and Y label, $P[X,Y] \neq P[X,Y|A]$. This is achieved by moving the distributions of classes enough so that a linear decision boundary obtains the predefined cumulative value for a negative class (FPR) and for a positive class (TPR).

Presently, many organizations may collect sensitive data related to their business. These datasets can capture real-world bias patterns, but are usually protected by privacy laws that prevent their disclosure. However, organizations may benefit from sharing their data with third-party companies, that can bring new insights and techniques. With the generation of privacy-aware synthetic datasets, data can be shared without disclosing any sensitive information.

Current evaluation practices in the fair ML literature vary wildly. The choice of fairness and performance metric may be highly task dependent. For instance, one can trivially achieve high accuracy (or low misclassification rate) on datasets with severe class imbalance (if a class represents 99% of the data, a model can achieve 99% accuracy by always predicting that class). Regarding fairness metrics, one can trivially achieve perfect equal opportunity by predicting all samples as positive, or achieve perfect predictive equality by predicting all samples as negative. As such, some ways to make metrics comparable between different models include setting a given threshold budget (e.g., number of allowed positive predictions) or choosing a specific point in the ROC curve (e.g., maximum number of false positives, or minimum number of true positives). This evaluation faithfully reflects the constraints of using ML models in the real-world, such as a minimum recall for a cancer detecting medical system, or a maximum false-positive rate for a fraud detection model. Note that this contrasts with the conventional procedure of evaluating models on a fixed arbitrary decision threshold, the most common of which arguably being $t=0.5$, i.e., $\hat{Y}=\mathbb{1}[f(x) \geq 0.5]$, for a given model f on a given data instance $x$.

Each of the benchmark's datasets is associated with a specific real-world scenario, and carries specific performance and fairness metrics drawn thereafter. Fairness metrics can be computed as the widest disparity between the model's performance per group on the relevant class:

$$\frac{\min_{a \in A} P[\hat{Y}=1 \mid A=a, Y=y]}{\max_{a \in A} P[\hat{Y}=1 \mid A=a, Y=y]}, \qquad (1)$$

where A is the set of sensitive attributes.

In assistive settings, a positive prediction is related to a positive outcome for the individual (e.g., funding for their project). As such, fairness is achieved by maximizing Equation 1 for the positive class y=1 (ratio of true positive rates). This fairness metric is also known as equal opportunity. Conversely, in punitive settings, a positive prediction is related to a negative outcome for the individual (e.g., losing access to their bank account for being flagged as fraudulent). In these cases, fairness is achieved by maximizing Equation 1 for the negative class y=0 (ratio of false positive rates). This fairness metric is also known as predictive equality, or equal opportunity with reference to y=0.

One additional consideration affecting the fairness and performance of ML algorithms is the choice of hyperparameters. This has been shown to be an important factor for both fairness and performance, as fairness-blind ML algorithms with the right choice of hyperparameters can even perform better than state-of-the-art bias mitigation algorithms. Furthermore, reporting results without hyperparameter optimization can lead to low reproducibility and high metric variance. In order to provide a fair comparison, it was given an equal budget of 50 trials to each ML algorithm, and show results for the best performing fair model of each.

Method evaluation in fair ML is still far from being systematic and robust. Conventional techniques typically perform ad-hoc evaluations on toy datasets. However, this renders comparison between bias mitigation techniques inconsistent and non-reproducible, providing no intuition of the interventions' true impact and discouraging their adoption in practice.

Techniques for generating anonymized and biased datasets are disclosed. In various embodiments, a process for generating a dataset comprises feature pre-processing and anonymization, Generative Adversarial Network (GAN), and sampling.

Techniques for obtaining a generated dataset with a predetermined bias for evaluating algorithmic fairness of a machine learning model are disclosed. In various embodiments, the generated dataset includes training data (used to train a machine learning model) and/or test data (used to test the performance of a machine learning model). The generated dataset (sometimes called "benchmark suite" or "benchmark") evaluates ML fairness under different biased patterns in data, indicating which types of data bias a given Fair ML algorithm is capable of handling and the robustness (resistance) of a trained ML model to the presence of bias in data.

FIG. 1A shows a schematic representation of an embodiment of a system for generating an evaluation dataset that is biased and optionally anonymized. Each of the components of the system 150 are like their counterparts in FIG. 1B unless otherwise described. Biased dataset generator 150 (sometimes simply called the system) includes a dataset generator 152 and a bias introducer 156.

Dataset generator 152 is configured to receive an input dataset 140. The input dataset, sometimes called a seed dataset, is processed by the dataset generator according to the disclosed techniques to generate an evaluation dataset. Dataset 140 may be tabular or any other format. An example of an input dataset is seed dataset 110. Dataset generator 152 outputs a reconstructed dataset 154, an example of which is dataset 114.

Bias introducer 156 is configured to inject a predetermined bias, which may be specified according to a configuration, to the anonymized reconstructed dataset 154 to form an evaluation dataset 158. An example of an evaluation dataset is dataset 118. The predetermined bias configured enables a user to specify a desired type of bias to inject into the dataset 154.

A more specific example of the system is shown in the following figure.

Figure 1B:
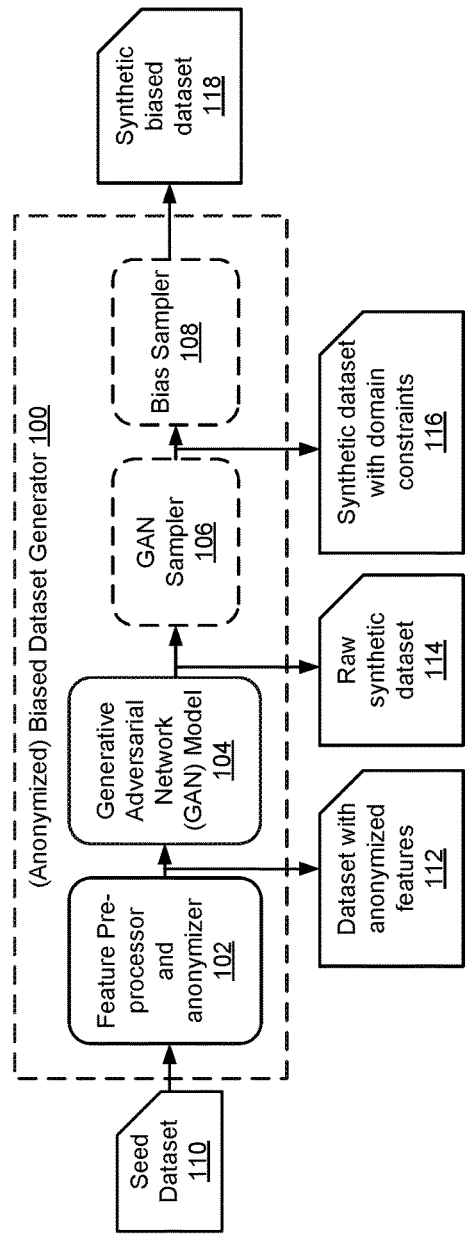
FIG. 1B shows a schematic representation of an embodiment of a system for a generator of anonymized and biased datasets.

FIG. 1B shows a schematic representation of an embodiment of a system for a generator of anonymized and biased datasets.

In an embodiment, (anonymized) biased dataset generator 100 is configured to produce a synthetic dataset with domain constraints 116. The biased dataset generator 100 includes a feature pre-processor and anonymizer 102, a generative model 104 (such as a GAN or CTGAN), and optionally one or more samplers 106 and 108. In other words, the functionality of 100 described herein may be embodied in any data sampler (e.g., GAN or autoencoder such as a Variational AutoEncoder or VAE) and, optionally, one or more samplers. Two samplers GAN sampler 106 and bias sampler 108 are described but this is merely exemplary and not intended to be limiting.

In an embodiment, feature pre-processor and anonymizer 102 is configured to create features, such as aggregations, that better describe the records to a machine learning algorithm when compared to the raw data (e.g., seed dataset 110), while removing information that can identify individual records, thus anonymizing personally identifiable information (PII) present in the records to produce a dataset with anonymized features 112.

In an embodiment, generative adversarial network model 104 is configured to generate a model (e.g., a CTGAN model) based on seed dataset 110, wherein the seed dataset for the CTGAN may be a concatenation of a training and validation sample, which may be from a real dataset.

In an embodiment, the GAN generator 104 is configured to extend this dataset with a column, indicating whether an instance belongs to the original training or validation sets. With this technique, the model learns the underlying distribution of the whole data, while simultaneously capturing any differences in the distributions of the training and validation samples.

In an embodiment, the GAN generator 104 is configured to perform grid-search optimization to choose the best hyperparameters for said GAN. To do so, a classifier is first trained and validated on the original dataset 110. This result serves as a baseline for next validations. For each GAN, synthetic train and validation sets 114 with the same sample size are generated. Then, a classifier with the same hyperparameters is trained on the synthetic dataset. Finally, the GAN is selected based on a corresponding classifier that achieves the closest performance, when compared to the original classifier, on both the original and synthetic validation datasets. Alternatively, hyperparameter optimization can be carried out using random-search, Bayesian optimization, bandit-based approaches, among other methods.

In an embodiment, GAN Sampler 106 is configured to build a dataset 116 by randomly sampling the CTGAN model and transforming the synthetic data to ensure several domain constraints, such as value ranges, that are otherwise not captured by the model. These are, for example, imputation of missing values for certain features, or rounding operations to obtain equal significant figures, when compared to the original dataset. Additionally, filters are also applied, to discard certain instances that are deemed invalid. These ensure that there are no repeated instances within the generated dataset or when compared to the original dataset. This further enforces privacy constraints, as no records can be traced back to the original dataset. Other filters may guarantee that no instance has invalid values, e.g., synthetic instances with negative values on count-based features, which may only take positive integer values.

In an embodiment, Bias Sampler 108 is configured to create a specific type of bias in the dataset generated by the GAN Sampler. The created dataset is a synthetic biased dataset 118. Various dataset variations that have different types of bias can be built using the bias sampler 108.

Figure 2:
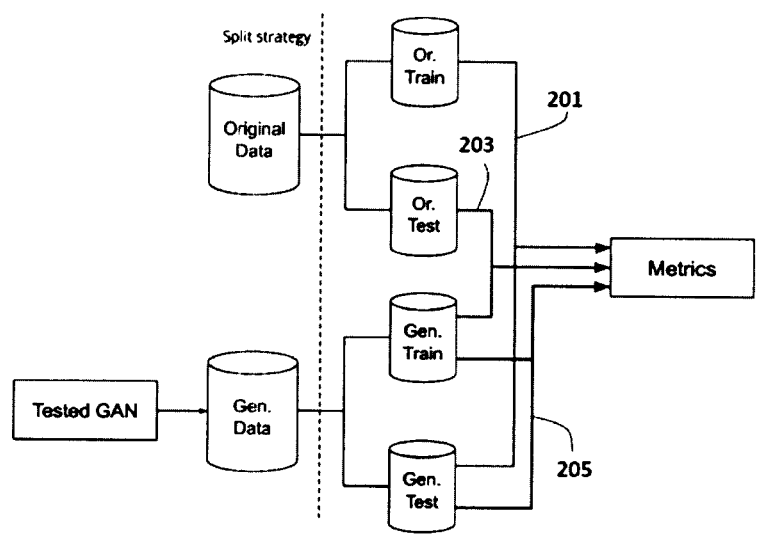
FIG. 2 shows a schematic representation of an embodiment of a combination of dataset parts for evaluation of generative performance.

FIG. 2 shows a schematic representation of an embodiment of a combination of dataset parts for evaluation of generative performance. Path 201 represents generated test evaluation, path 203 represents generated train evaluation, and path 205 represents generated train and test evaluation.

In an embodiment, three sets of metrics, corresponding to evaluating the performance of the generated test (201) set, the generated training (203) set, and both sets simultaneously (205). Here, the split strategy is shared in both original and generated data, e.g., splitting by month.

In another embodiment, instead of training a single model with a configuration obtained a priori, several models are trained, with a given hyperparameter sampling strategy, e.g., Random Search, TPE. In an embodiment, a second step of evaluation, which is based on the statistical comparison of the generated data and the original data, is divided in two different parts, which are the evaluation of interaction between features, and the evaluation of individual distribution of features. Because of this, the correlation between pairs of features is measured to produce a correlation matrix.

In an embodiment, the maximum absolute difference in correlations matrices of the original and generated datasets is calculated. In the latter, distributions are compared individually through a similarity metric, such as the Jansen-Shannon divergence or Wasserstein metric, or alternatively Kolmogorov-Smirnov test/distance.

An objective of the disclosed sampling method is to obtain one or more numerical variables, and underlying distributions, which are capable of producing a linear decision boundary with a given expected functioning point in the ROC space, with user-defined TPR and FPR. Thus, an aspect of the present disclosure is to manipulate the mean of, multivariate, normal distributions, in order to obtain these desired metrics.

For multivariate normal distributions, a numeric solver may be used to find the appropriate mean vector, as there is typically no closed form to calculate the volume under the distributions, CDF.

In an embodiment, the process of identifying the mean value is repeated for all the protected groups present in the data. The distributions are then sampled according to both the protected group and label of a given instance in the dataset.

In another embodiment, a transformation of rotation and scaling is applied to the obtained feature vectors, which do not affect the performance of a linear classifier in the features, to generate a sample of values with more desirable properties, e.g., $\mu=0$, $\sigma=1$, which can be useful for using with artificial neuronal networks or logistic regressions, for example.

TABLE 1

Conditional Class Separability Algorithm

Require: $TPR_a$ and $FPR_a$ for a ∈ A, Rotation matrix $\Theta$, Scaling factor $\beta$
1: for a ∈ A do
2:     Define matrix $\mu_{a,Y=0}$.
3:     Numerically find matrix $\mu_{a,Y=1}$ which satisfies constraints in FPR, TPR.
4:     Create $MVN(\mu_{a,Y=0}, \sigma_a)$ and $MVN(\mu_{a,Y=1}, \sigma_a)$.
5:     Sample both MVN to obtain $x_1, x_2, ...x_n$ for instances of group a.
6:     Apply rotation matrix $\Theta$ and scaling $\beta$ to feature vector $x_1, x_2, ...x_n$.

Figure 3:
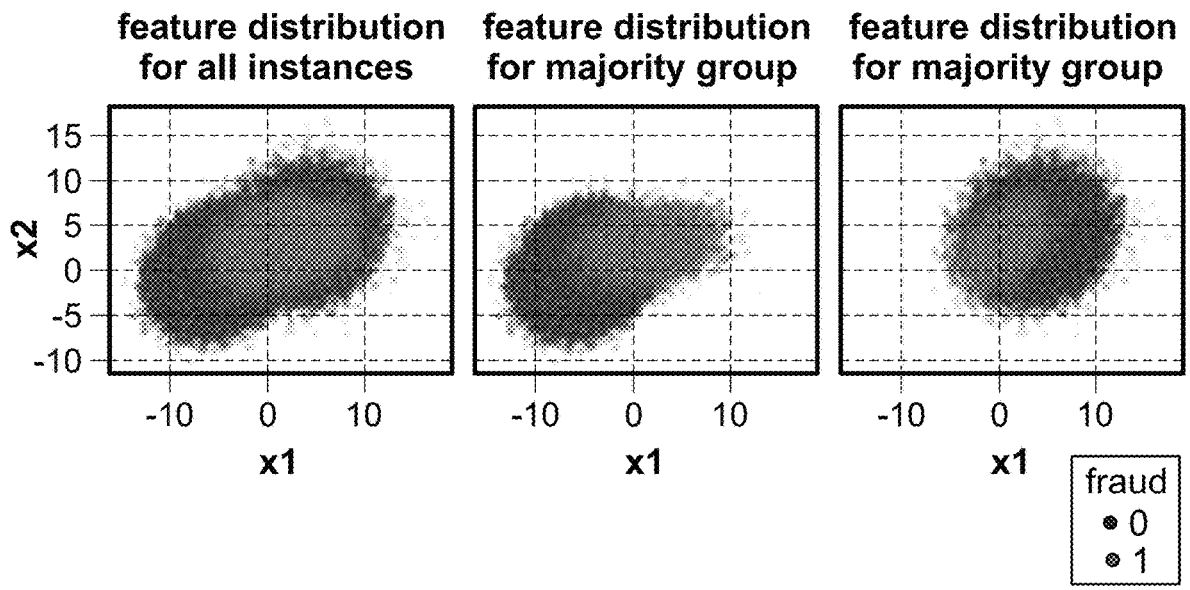
FIG. 3 shows a graphical representation of distinct conditional class separability for a feature distribution for all instances, on the left, for a majority group, on the middle, and for a minority group, on the right according to an embodiment.

FIG. 3 shows a graphical representation of distinct conditional class separability for a feature distribution for all instances, on the left, for a majority group, on the middle, and for a minority group, on the right.

Figure 4:
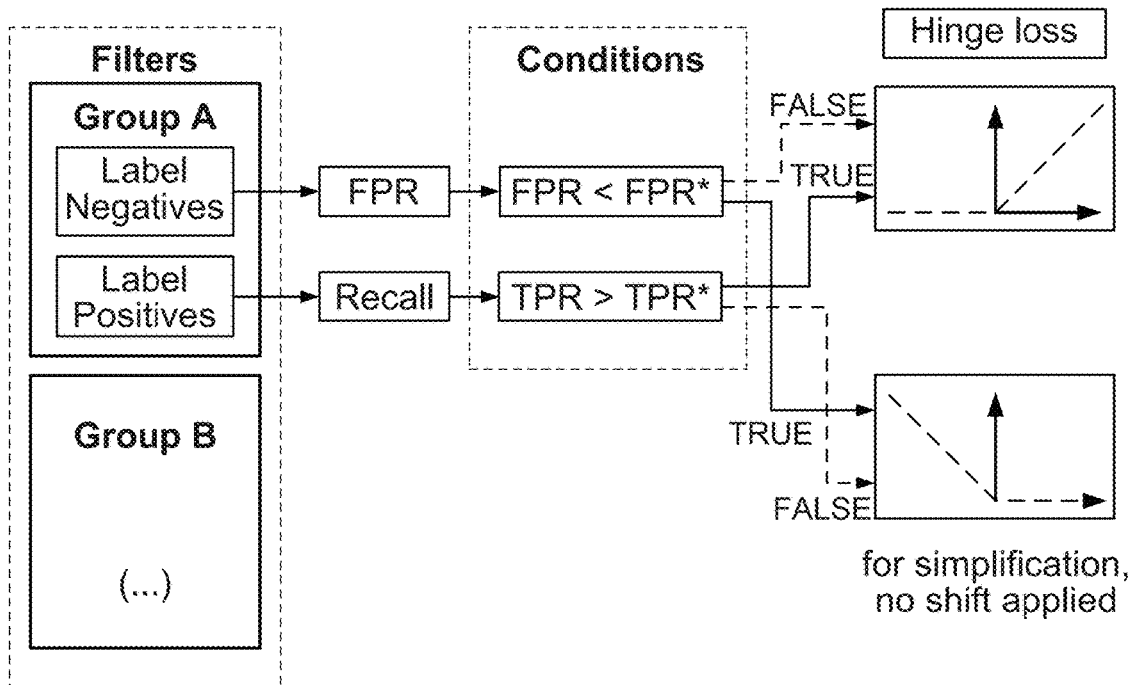
FIG. 4 shows a schematic representation of an embodiment of a flow of loss function in GAN with Conditional Class Separability.

FIG. 4 shows a schematic representation of a flow of loss function in GAN with Conditional Class Separability. Unlike other embodiments in which sampling or a separate column generation process is used to introduce a predetermined bias, in this example a GAN is configured to generate biased datasets.

In an embodiment, to replace the sampling on group size disparity, the value function of the GAN is defined according to Equation 2:

$$V(G, C) = C(x) - C(G(z)) + \sum_{a=1}^{N} |P(G(z)_A = a) - P_a| \quad (2)$$

where G is the Generator, C is the Critic (e.g., following the Wasserstein GAN value function definition, WGAN, loss), G(z) is a generated sample, A is a given categorical feature that can be used to control the value, a is a possible value for the feature, and $P_a$ the probability of value a on feature A. Thus, in the value function given by Equation 2, there is a term to control prevalence of one or more groups.

In an embodiment, to replace the prevalence disparity, another term is added to the value function:

$$V(G, C) = C(x) - C(G(z)) + \sum_{a=1}^{N} |P(Y = 1 \mid G(z)_A = a) - P_{y_a=1}| \quad (3)$$

where $Py_a=1$ is the desired prevalence for group a.

For prevalence disparity, datasets are generated where the probability of the label is conditioned by the different groups of the protected attribute, e.g., different fraud rates for age groups.

The method for introduction of Conditional Class Separability does not need additional columns for the effect. In an embodiment, this can be achieved by adding an additional output layer to the GAN architecture, which is a single-layer neural network, i.e., a logistic regression, fitting and attempting to classify the generated samples by the GAN. Both TPR and FPR are calculated for this classifier for each group defined in the data, and the differences between expected, FPR* and TPR*, and obtained metrics, FPR and TPR, are back-propagated through the generator. Since the metrics of TPR and FPR are not differentiable, these are approximated through the hinge function. Thus, in the value function given by Equation 3, there is a term to control label prevalence of one or more groups.

While the former two properties are achieved by the generator without any significant degradation on the process, due to the higher complexity of the loss function, this last transformation may cause convergence issues. There may be a trade-off between better performance of the generator (hence more realistic generated samples) and the penalty of these constraints (samples that follow the desired properties).

In an embodiment, a benchmark suite is provided for systematic evaluation of fairness of ML models using real and large tabular datasets. In an embodiment, a benchmark suite includes assistive and punitive decision-making tasks, enabling the in-depth study of distinct fairness interventions under several real-world scenarios.

In some experiments, the benchmark suite (sometimes simply called "benchmark") was used for over 5,000 models for fairness, including state-of-the-art bias mitigation methods and several ML algorithms for tabular data.

When extending the benchmark suite with performance results for the different datasets, in an embodiment, reports of evaluation metrics for different models are used, with different seeds, and different thresholds, thus ensuring a more robust comparison.

In an embodiment, a benchmark comprises two types of interventions: punitive and assistive, represented in two different datasets.

The benchmark suite may be initiated with two datasets: one for an assistive ML task, and one for a punitive ML task. An example of an assistive ML task dataset is the publicly available Donors Choose dataset (166,000 rows), as further described herein. An example of a punitive ML task dataset is a Fraud dataset (1,000,000 rows).

In an embodiment, a set of commonly used state-of-the-art ML algorithms is selected to be part of the seed of the benchmark suite. Examples of commonly used state-of-the art ML algorithms include Light Gradient Boosting Machine (LightGBM), which typically has better results in tabular data, as well as well-known bias reduction algorithms from the fair ML literature. In an embodiment, pre-processing such as omitting the protected attribute from training, also known as unawareness, and equalizing the prevalence across all sub-groups in training can be performed. The performance of the disclosed techniques was evaluated and compared with the performance of complex state-of-the-art algorithms on different tasks.

To go beyond the natural biases that occur in datasets, models and bias mitigation techniques in predefined types of bias, which are artificially injected in the dataset, may be evaluated. This may provide fine-grained control over the tests and increase the overall robustness (i.e., robustness to different bias patterns in data) of the benchmark.

In an embodiment, to introduce bias, novel features are generated in the feature space, so that the class label Y is easier to separate when conditioned on one of the values of the protected attribute A.

In an embodiment, the benchmark is focused on datasets pertaining to real-world decision-making tasks. In order to cover a variety of fairness scenarios, an assistive task dataset (Donors Choose), and a punitive task dataset (Fraud) were used. In an embodiment, known bias patterns were embedded into the punitive task dataset using synthetic protected groups, to surface possible shortcomings of the bias mitigation algorithms being evaluated. For each dataset, a fairness metric and a predictive performance metric were defined, taking into account the context of the ML task at hand.

The Donors Choose dataset is a publicly available tabular dataset with considerable size, 166K rows, and that is often used for evaluating bias mitigation algorithms. It contains data pertaining to fundraisers for thousands of projects proposed for/by K-12 schools. The objective is identifying projects at risk of being underfunded in order to provide assistive tailored interventions. The records are divided into train and validation sets, with 99K and 67K instances each. As an assistive task, fairness is achieved if the model's recall is independent of the poverty level of the school each project belongs to. This is also known as equal opportunity for schools with different poverty levels. This fairness criterion is optimized by maximizing the ratio between the group with lowest recall and the group with highest recall). In the dataset, the predictive performance metric is recall. This is an assistive setting with limited budget, with an objective to discover under-funded projects while minimizing the number of over-funded projects.

The Fraud dataset contains anonymized tabular data from a real-world stream of client-bank interactions. In an embodiment, this dataset, optionally together with three other variants, are used to test known bias patterns. The dataset contains 1,000,000 rows, split into 750,000 rows for training, and 250,000 rows for testing. The protected attribute is the client age. Although it is a discrete value, in some experiments, the client age is binarized to compute fairness metrics, by considering a threshold at age 50. The train set has 80% of the records belonging to the younger group, with a fraud rate of 1.5%, while the remaining 20% are in the older group, with a fraud rate of 3%. The validation set has similar split sizes but the fraud rates increase to 2% and 5% for the younger and older groups, respectively.

As a punitive task, fairness is achieved if the model's false-positive rate is independent of the customer's age group. This is also known as predictive equality across age groups. Regarding predictive performance, the metric is recall. It is common practice in the industry to use this metric at a fixed FPR, in order to detect fraudulent transactions, without raising to many false positives.

In some experiments, to further understand the behaviour of algorithms with respect to different bias patterns, three variants of the banking fraud dataset are created. Each variant has a combination of one or more bias types as follows.

For the first variant (Type 1), an additional synthetic column is appended to the data: a protected attribute with a majority (e.g., represented by 90% of the instances) and a minority group (e.g., group size disparity). The fraud rate of the latter is five times larger than the former, prevalence disparity.

The second variant (Type 2) has the previously introduced protected attribute (group size disparity), but no prevalence disparity. Instead, it features distinct conditional class separability. To achieve this, two new columns $x_1$ and $x_2$ are created, sampled from a plurality (e.g., four) multivariate normal distributions—one for each combination of protected attribute and class label. Inside this space, fraudulent observations from the majority group are easier to distinguish from non-fraudulent ones (illustrated in FIG. 3). Classifiers are then expected to be less precise for the minority group.

The third variant (Type 3) has distinct conditional class separability relative to the real protected attribute (e.g., client age), as well as prevalence disparity. One goal of this variant is to aggravate whatever bias is already present in the data, making for a harder fairness challenge.

A set of commonly used fairness-blind ML algorithms: Logistic Regression, Decision Tree, Random Forest, LightGBM, XGBoost, and Neural Networks (MLP) was benchmarked. In addition, two state-of-the-art bias reduction algorithms were evaluated. The bias reduction algorithms have open-source packages: TensorFlow constrained optimization5 (TFCO), a package used to train neural networks with fairness constraints; and the Grid Search method (GS)

for reducing constrained optimization to cost-sensitive learning. These models were trained on-premises on a cluster with multiple CPUs. The MLP models were trained using GPUs.

Experimental results show that the disclosed techniques perform well. In an evaluation, an 80% fairness threshold was used, meaning an apparatus, system, or process is considered to be fair if it scores higher than 80% in the fairness metric. In various embodiments, if no model is found to be fair for some algorithm, this result is output along with a model found to mostly closely the fairness criterion/criteria.

Globally, it is noticeable that conventional classification algorithms show general good predictive accuracy but poor fairness. Out of the fairness-blind models, LGBM and XGB score the highest recall. The MLP and RF algorithms achieved comparable, although slightly worse, results. Less complex algorithms, such as Decision Trees or Logistic Regression show sub-par performance in general. The algorithms are not able to consistently satisfy the fairness threshold set at an acceptable global recall. In biased datasets, unfairness is even more evident, and performance increases, which can be explained by the protected attribute's greater predictive power. Indeed, FIG. 3 shows that, in these datasets, most points are accumulated in the lower right quadrant of their plots (high performance, low fairness).

In an embodiment, a protected attribute column is removed from the dataset before training the fairness-blind algorithms. In the Base Fraud, Type 2 and Type 3 bias datasets, unawareness leads to an increase in fairness, even where desired thresholds are unmet. When unaware algorithms satisfy the fairness threshold, the TPR measurement is relatively low (<20%), which may constitute a steep fairness-performance trade-off. The small fairness increase is not surprising, since removing the protected attribute before training typically does not account for other correlated features. The algorithms will still have access to said features, leaving their predictions subject to the remaining latent bias. Conclusions are similar for the Donors Choose dataset, but not for Fraud Type 1 Bias. In the latter, the protected attribute is synthetic, and correlated only with the class label, not the features (in expected value). Thus, removing it allows algorithms to keep the performance high and become fair.

Equalizing prevalences in the training set leads to good results in the Fraud, Fraud Type 1 Bias, and Donors Choose datasets. In an embodiment, correlations between the protected attribute and the class label are removed by undersampling the majority group's negative observations. Doing so also addresses the problem of correlations with the features, as some of this information is eliminated when dropping observations. Some drop in performance was expected, as the dataset is truncated, but results show that it was not large. In Fraud Type 2, prevalences are already balanced, so applying the method does not result in any significant change. In Fraud Type 3, some Decision Tree models were close to the fairness threshold, but none surpassed it. These datasets show that simple pre-processing methods might not be the best solution to address complex fairness challenges.

The TFCO algorithm achieved the best results for the Type 2 bias dataset. It outperformed the algorithms for all thresholds, while achieving high fairness scores. For the remaining datasets, although this method achieved high fairness scores, its performance degraded. Throughout all of these tests, the TFCO models seemed very unstable, with their results scattered across the entire space, which is not desirable. The Grid Search method achieved the best score in the Type 3 dataset, with the Logistic Regression variation outperforming all other fair algorithms in the task. At a 10% threshold, two models of this kind were the only ones to achieve fairness and score >60% TPR (FIG. 3). For the Type 2 bias, its performance was comparable to the TFCO method (the best for the dataset), but the best performing methods did not comply with the fairness threshold. In the remaining datasets, it achieved results that were usually on par with the best performing methods (pre-processing). Considering all the experiences, this method seemed more stable than the previous one while, on average, achieving very good results. In general, in processing seems to be a fine solution for the datasets with more complex bias patterns. However, they were quite volatile in both fairness and performance, especially TFCO. FIG. 3 illustrates this, with TFCO points lying all over the plots.

Techniques to create anonymized tabular datasets and a benchmark for fair ML on tabular data are disclosed. In an embodiment, a benchmark is kickstarted with two datasets, Donors Choose and Banking Fraud dataset, each representing a different type of intervention: assistive and punitive, respectively. GANs may be used when applied to datasets that contain sensitive data.

It is also disclosed components to inject predefined types of bias in the original datasets, to obtain more robust and general measurements.

Two commonly used pre-processing methods, Unawareness and Equalized Prevalence, and two state-of-the-art in-processing methods, TFCO and Grid-Search were evaluated. As a baseline, it was used the default implementation of classification algorithms. This benchmark may be highly adapted to tabular data and aims to provide control over the existent biases in the data, while also maintaining a realistic scenario.

Conventional fairness-blind methods typically have good performance but poor fairness results. Pre-processing methods are fairer for simpler types of bias. However, for more complex bias patterns, they are either not applicable, equalized prevalences, or do not address latent correlations between features and protected attribute, unawareness. In other words, in a scenario in which there is only conditional class separability, it is not possible to equalize prevalences. At the same time, removing the protected attribute does not necessarily mask the protected attribute, so unawareness is ineffective. In these cases, in-processing methods may achieve much better results. Increasing the threshold of predicted positives leads to general increases in both performance and fairness.

The disclosed techniques find application in generating various datasets. Some examples will now be discussed, but these are merely exemplary and not intended to be limiting. In an embodiment, the disclosed techniques are applied to generate banking fraud datasets. A GAN is used to create an anonymized replica of a real-world financial data stream. To test for different types of bias, three variations of this dataset are generated, each one encoding specific bias patterns, such as group-wise distinct class conditional distributions.

In an embodiment, two types of interventions are performed: punitive and assistive, represented in two different datasets. The first is a banking fraud dataset, representing a punitive intervention, denying access to a bank account, and an anonymized replica of a real-world financial fraud detection dataset using a GAN. The second dataset is the publicly available Donors Choose dataset, with an assistive setting, providing monetary assistance to projects that risk being underfunded. With these datasets, it is possible to assess the different fairness interventions with realistic sample sizes, 1,000,000 and 166,000 instances, respectively, comprising complex real-world distributions and different types of biases.

Using the previously mentioned datasets, over 5,000 models were evaluated in datasets reflecting distinct real-world case scenarios. Considering a standardized set of fairness metrics, different hyperparameter searches were performed for eight different ML algorithms, including both commonly used algorithms such as logistic regression, LightGBM, and neural networks, and also models in fair ML. Initial results show that 1) baselines tend to exhibit better predictive performance but poor fairness, 2) simpler patterns can be efficiently mitigated with pre-processing interventions with minimal degradation in predictive performance, and, 3) in-processing interventions yield promising results in the presence of more complex bias patterns but their results are also more volatile, sometimes failing to be on par with the baselines.

TABLE 2

Fraud base test results

| Threshold | 5% | | 10% | | 20% | |
|---|---|---|---|---|---|---|
| Method | Global TPR | Pred. Equality | Global TPR | Pred. Equality | Global TPR | Pred. Equality |
| LGBM | 13.67% | 83.22% | 18.02% | 92.97% | 26.85% | 95.99% |
| LGBM + UN | 15.67% | 70.63% | 19.83% | 85.75% | 28.46% | 92.46% |
| LGBM + EP | 42.09% | 97.47% | 57.67% | 98.13% | 74.71% | 88.6% |
| RF | 38.42% | 37.35% | 52.81% | 41.7% | 67.06% | 48.7% |
| RF + UN | 40.89% | 43.55% | 54.29% | 48.97% | 69.9% | 57.26% |
| RF + EP | 39.96% | 73.69% | 55.57% | 75.15% | 69.18% | 76.41% |
| XGB | 26.82% | 46.54% | 39.59% | 53.45% | 55.5% | 60.9% |
| XGB + UN | 25.62% | 64.42% | 37.62% | 67.63% | 53.92% | 74.12% |
| XGB + EP | 42.06% | 80.56% | 57.57% | 93.92% | 74.55% | 83.54% |
| DT | 29.32% | 64.97% | 27.08% | 77.17% | 45.95% | 84.53% |
| DT + UN | 19.12% | 68.68% | 27.58% | 81.77% | 46.54% | 80.47% |
| DT + EP | 32.27% | 80.77% | 46.05% | 80.31% | 63.37% | 80.61% |
| MLP | 31.42% | 46.41% | 43.9% | 54.22% | 59.88% | 62.8% |
| MLP + UN | 28.72% | 54.02% | 41.07% | 61.13% | 56.76% | 69.15% |
| MLP + EP | 39.38% | 83.55% | 53.1% | 81.49% | 72.04% | 82.17% |
| LR | 4.94% | 99.04% | 9.87% | 98.32% | 51.79% | 86.99% |
| LR + UN | 4.94% | 99.04% | 9.87% | 98.32% | 51.79% | 86.99% |
| LR + EP | 4.94% | 99.04% | 9.87% | 98.32% | 67.09% | 84.83% |
| TFCO | 27.59% | 88.93% | 40.8% | 93.72% | 57.8% | 98.38% |
| GridSearch DT | 29.15% | 94.24% | 40.98% | 82.94% | 63.91% | 80.83% |
| GridSearch LR | 34.88% | 87.09% | 49.24% | 95.16% | 67.76% | 85.48% |
| GridSearch LGBM | 40.55% | 97.68% | 56.28% | 96.47% | 73.53% | 91.55% |

TABLE 3

Fraud base best TPR

| | 5% | | 10% | | 20% | |
|---|---|---|---|---|---|---|
| Threshold Method | TPR | Pred. Equality | TPR | Pred. Equality | TPR | Pred. Equality |
| LGBM | 43.81% | — | 59.51% | — | — | — |
| XGB | — | — | — | — | 76.27% | — |

TABLE 4

Fraud Type 1 test results

| Threshold | 5% | | 10% | | 20% | |
|---|---|---|---|---|---|---|
| Method | Global TPR | Pred. Equality | Global TPR | Pred. Equality | Global TPR | Pred. Equality |
| LGBM | 17.73% | 50.96% | 21.85% | 72.46% | 30.3% | 85.46% |
| LGBM + UN | 43.82% | 99.63% | 59.59% | 97.17% | 76.07% | 98.75% |
| LGBM + EP | 43.96% | 95.8% | 59.43% | 95.54% | 76.07% | 98.39% |
| RF | 45.01% | 16.84% | 50.28% | 27.57% | 66.43% | 35.42% |
| RF + UN | 42.03% | 98.33% | 57.33% | 98.32% | 74.32% | 99.24% |
| RF + EP | 41.99% | 96.65% | 57.2% | 96.55% | 74.41% | 97.62% |
| XGB | 29.15% | 38.28% | 41.18% | 45.91% | 57.18% | 55.49% |
| XGB + UN | 43.65% | 99.86% | 59.39% | 97.81% | 76.27% | 99.67% |

TABLE 4-continued

Fraud Type 1 test results

| Threshold | 5% | | 10% | | 20% | |
|---|---|---|---|---|---|---|
| Method | Global TPR | Pred. Equality | Global TPR | Pred. Equality | Global TPR | Pred. Equality |
| XGB + EP | 43.55% | 96.21% | 58.97% | 98.43% | 75.77% | 98.01% |
| DT | 22.95% | 45.1% | 27.05% | 67.03% | 50.83% | 88.32% |
| DT + UN | 34.5% | 98.11% | 47.16% | 100.0% | 64.61% | 98.79% |
| DT + EP | 33.86% | 99.2% | 48.15% | 99.78% | 65.21% | 99.24% |
| MLP | 33.38% | 39.76% | 45.63% | 51.98% | 60.78% | 67.24% |
| MLP + UN | 42.46% | 99.24% | 57.83% | 98.76% | 75.25% | 99.1% |
| MLP + EP | 41.97% | 90.45% | 57.24% | 89.12% | 74.64% | 90.49% |
| LR | 4.94% | 96.98% | 9.87% | 95.28% | 19.52% | 98.29% |
| LR + UN | 37.0% | 97.9% | 51.78% | 99.18% | 69.61% | 98.48% |
| LR + EP | 36.95% | 97.87% | 52.19% | 97.61% | 69.81% | 97.14% |
| TFCO | 4.97% | 85.39% | 10.87% | 84.62% | 21.88% | 85.73% |
| GridSearch DT | 32.61% | 97.13% | 47.62% | 99.36% | 64.24% | 98.38% |
| GridSearch LR | 37.06% | 87.42% | 52.39% | 87.62% | 69.29% | 89.91% |
| GridSearch LGBM | 42.63% | 86.04% | 57.88% | 90.85% | 75.42% | 91.94% |

TABLE 5

Fraud Type 1 best TPR

| Threshold | 5% | | 10% | | 20% | |
|---|---|---|---|---|---|---|
| Method | TPR | Pred. Equality | TPR | Pred. Equality | TPR | Pred. Equality |
| LGBM | 48.12% | — | 63.47% | — | — | — |
| XGB | — | — | — | — | 78.34% | — |

TABLE 6

Fraud Type 2 test results

| Threshold | 5% | | 10% | | 20% | |
|---|---|---|---|---|---|---|
| Method | Global TPR | Fred. Equality | Global TPR | Fred. Equality | Global IPK | Pred. Equality |
| LGBM | 29.83% | 80.32% | 33.28% | 90.2% | 85.92% | 91.87% |
| LGBM + UN | 5.08% | 79.97% | 15.19% | 89.15% | 24.31% | 95.79% |
| RF | 85.22% | 42.89% | 84.62% | 40.06% | 91.09% | 57.06% |
| RF + UN | 63.88% | 5.84% | 81.64% | 8.46% | 94.52% | 14.71% |
| XGB | 84.9% | 35.89% | 92.08% | 37.11% | 96.74% | 42.18% |
| XGB+UN | 61.18% | 10.09% | 73.84% | 13.76% | 86.55% | 22.94% |
| DT | 66.94% | 62.01% | 74.95% | 92.91% | 85.93% | 96.43% |
| DT + UN | 42.14% | 19.29% | 44.84% | 41.45% | 50.94% | 64.99% |
| MLP | 83.88% | 49.73% | 86.83% | 41.95% | 92.54% | 49.16% |
| MLP + UN | 71.68% | 6.58% | 78.57% | 9.42% | 89.93% | 18.81% |
| LR | 78.71% | 37.71% | 85.15% | 51.17% | 88.87% | 64.09% |
| LR + UN | 58.23% | 3.41% | 77.78% | 7.84% | 91.01% | 17.57% |
| TFCO | 79.8% | 91.25% | 91.43% | 91.84% | 96.46% | 80.96% |
| GridSearch DT | 78.78% | 94.31% | 81.89% | 72.95% | 93.3% | 84.14% |
| GridSearch LR | 77.73% | 80.91% | 84.77% | 91.41% | 88.68% | 98.34% |
| GridSearch LGBM | 78.34% | 77.59% | 90.32% | 78.94% | 94.92% | 62.17% |

TABLE 7

Fraud Type 2 best TPR

| Threshold | 5% | | 10% | | 20% | |
|---|---|---|---|---|---|---|
| Method | TPR | Pred. Equality | TPR | Pred. Equality | TPR | Pred. Equality |
| LGBM | — | — | — | — | 98.02% | — |
| XGB | 87.8% | — | 94.53% | — | — | — |

TABLE 8

Fraud Type 3 test results

| Threshold | 5% | | 10% | | 20% | |
|---|---|---|---|---|---|---|
| Method | Global TPR | Pred. Equality | Global TPR | Pred. Equality | Global TPR | Pred. Equality |
| LGBM | 28.13% | 61.81% | 31.66% | 80.82% | 39.05% | 90.53% |
| LGBM + UN | 22.9% | 36.34% | 26.91% | 59.83% | 34.79% | 78.02% |
| LGBM + EP | 14.98% | 93.0% | 29.43% | 93.4% | 58.25% | 94.74% |
| RF | 79.01% | 21.01% | 67.53% | 20.89% | 83.38% | 29.24% |
| RF + UN | 47.44% | 8.37% | 64.58% | 13.07% | 88.36% | 16.8% |
| RF + EP | 75.73% | 63.52% | 87.2% | 42.05% | 88.8% | 35.12% |
| XGB | 69.94% | 21.13% | 81.75% | 24.94% | 90.23% | 32.55% |
| XGB + UN | 50.08% | 13.02% | 66.18% | 18.39% | 81.18% | 28.42% |
| XGB + EP | 79.4% | 52.01% | 80.16% | 44.52% | 88.45% | 51.26% |
| DT | 58.21% | 39.6% | 60.21% | 67.18% | 64.72% | 83.48% |
| DT + UN | 34.77% | 26.74% | 37.91% | 51.67% | 44.56% | 72.63% |
| DT + EP | 62.29% | 45.7% | 63.93% | 71.78% | 67.82% | 85.93% |
| MLP | 71.36% | 37.6% | 81.72% | 47.6% | 89.62% | 56.59% |
| MLP + UN | 65.98% | 14.5% | 71.49% | 20.61% | 84.79% | 29.63% |
| MLP + EP | 72.56% | 49.38% | 85.39% | 50.53% | 92.87% | 59.1% |
| LR | 4.94% | 99.04% | 9.87% | 98.32% | 19.52% | 99.57% |
| LR + UN | 4.94% | 99.04% | 9.87% | 98.32% | 19.52% | 99.57% |
| LR + EP | 13.36% | 80.94% | 9.87% | 98.32% | 51.79% | 86.99% |
| TFCO | 4.94% | 99.04% | 9.87% | 98.32% | 19.52% | 99.57% |
| GridSearch DT | 65.26% | 65.48% | 67.36% | 57.3% | 70.88% | 77.7% |
| GridSearch LR | 58.91% | 96.61% | 65.09% | 87.13% | 72.95% | 96.46% |
| GridSearch LGBM | 74.69% | 77.42% | 85.9% | 67.15% | 92.53% | 66.18% |

TABLE 9

Fraud Type 3 best TPR

| Threshold | 5% | | 10% | | 20% | |
|---|---|---|---|---|---|---|
| Method | TPR | Pred. Equality | TPR | Pred. Equality | TPR | Pred. Equality |
| LGBM | 83.85% | — | 92.94% | — | — | — |
| XGB | — | — | — | — | 97.54% | — |

TABLE 10

Donors Choose test results

| Threshold | 5% | | 10% | | 20% | |
|---|---|---|---|---|---|---|
| Method | Global TPR | Eq. Opportunity | Global TPR | Eq. Opportunity | Global TPR | Eq. Opportunity |
| LGBM | 9.11% | 80.45% | 16.99% | 87.11% | 31.09% | 88.13% |
| LGBM + UN | 9.31% | 83.56% | 17.24% | 80.26% | 31.32% | 80.47% |
| LGBM + EP | 9.43% | 99.75% | 17.28% | 90.0% | 31.51% | 89.64% |
| RF | 8.61% | 52.45% | 17.36% | 55.54% | 32.09% | 63.42% |
| RF + UN | 8.64% | 70.28% | 16.5% | 72.95% | 31.37% | 77.01% |
| RF + EP | 9.29% | 80.58% | 17.71% | 83.28% | 32.13% | 86.8% |
| XGB | 8.18% | 81.55% | 15.89% | 81.43% | 29.7% | 83.5% |
| XGB + UN | 9.29% | 81.5% | 17.31% | 80.9% | 32.35% | 80.89% |
| XGB + EP | 9.37% | 98.06% | 17.85% | 91.52% | 32.55% | 98.06% |
| DT | 7.78% | 87.63% | 14.72% | 87.57% | 29.0% | 87.34% |
| DT + UN | 7.93% | 93.77% | 15.29% | 85.05% | 29.04% | 80.82% |
| DT + EP | 8.21% | 89.85% | 15.46% | 85.49% | 29.36% | 86.3% |
| MLP | 5.96% | 94.53% | 11.45% | 90.52% | 21.47% | 92.81% |
| MLP + UN | 5.96% | 83.84% | 11.45% | 90.52% | 21.47% | 88.08% |
| MLP + EP | 5.94% | 84.47% | 11.45% | 90.52% | 22.31% | 89.78% |
| LR | 5.94% | 84.6% | 11.44% | 90.59% | 20.45% | 90.63% |
| LR + UN | 5.94% | 84.6% | 11.44% | 90.59% | 20.45% | 90.63% |
| LR + EP | 5.94% | 84.6% | 11.44% | 90.59% | 20.45% | 90.63% |
| TFCO | 5.94% | 84.6% | 11.44% | 90.59% | 20.74% | 86.47% |
| GridSearch DT | 6.55% | 73.39% | 13.97% | 83.48% | 25.16% | 95.27% |
| GridSearch LR | 6.05% | 82.26% | 11.47% | 90.46% | 20.46% | 90.76% |
| GridSearch LGBM | 9.16% | 71.13% | 13.42% | 83.21% | 26.75% | 85.47% |

TABLE 11

| | Donors Choose best TPR | | | | | |
| --- | --- | --- | --- | --- | --- | --- |
| | 5% | | 10% | | 20% | |
| Threshold Method | TPR | Eq. Opportunity | TPR | Eq. Opportunity | TPR | Pred. Eq. Opportunity |
| RF + EQ | 9.47% | — | — | — | — | — |
| XGB + EQ | — | — | 17.85% | — | 32.55% | — |

Figure 5:
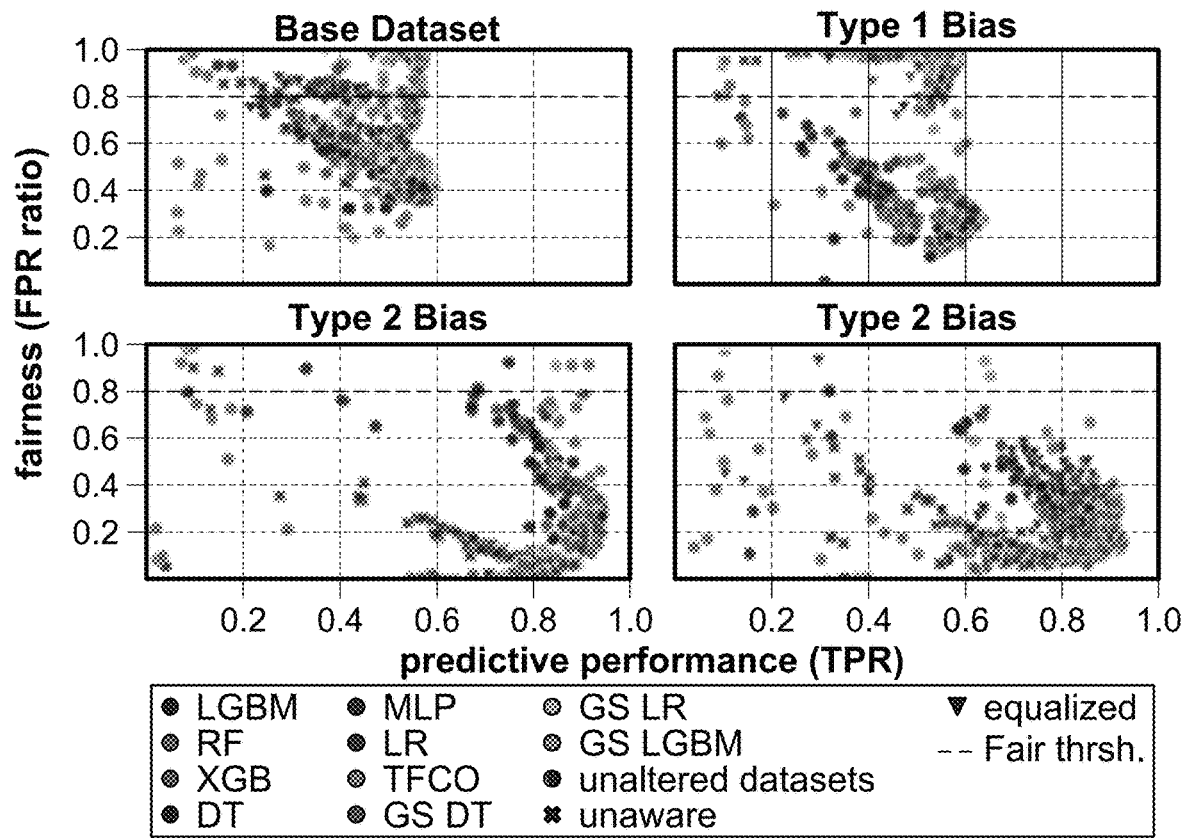
FIG. 5 shows a graphical representation of various models' performance and fairness, all fraud datasets for the top 10% predicted positives according to an embodiment.

FIG. 5 shows a graphical representation of various models' performance and fairness, all fraud datasets for the top 10% predicted positives.

Figure 6A:
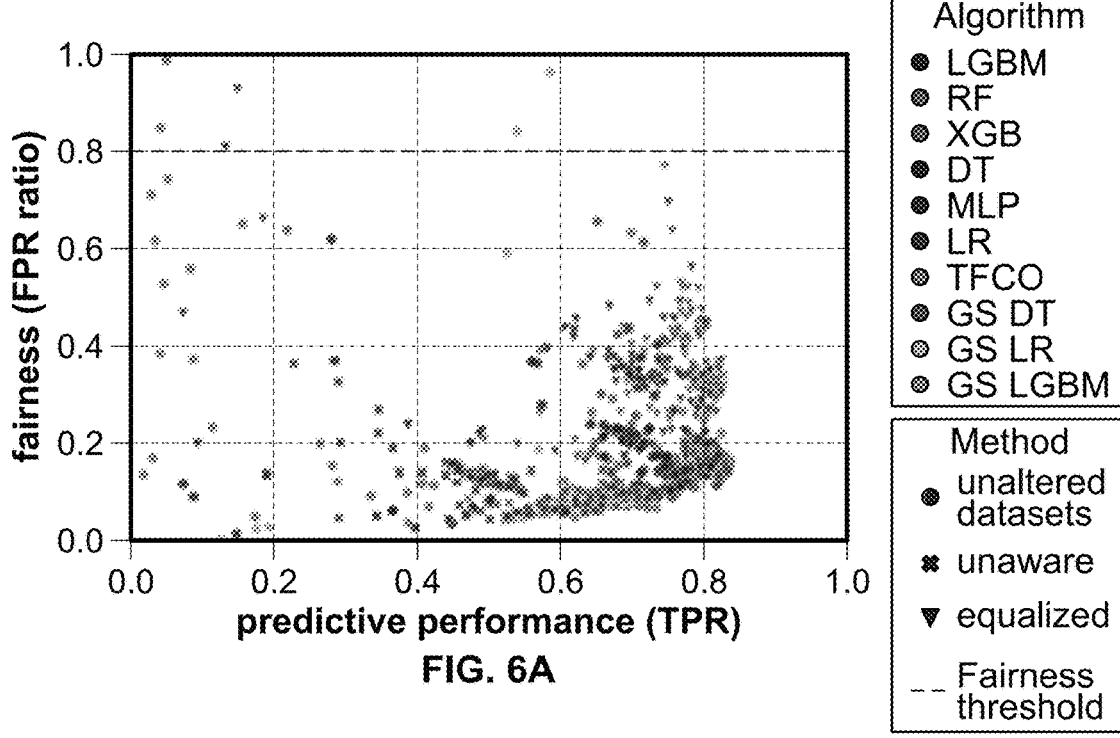
FIG. 6A shows a graphical representation of a fraud type 3 dataset models performance for the top 5% predicted positives according to an embodiment.

FIG. 6A shows a graphical representation of a fraud type 3 dataset models performance for the top 5% predicted positives.

Figure 6B:
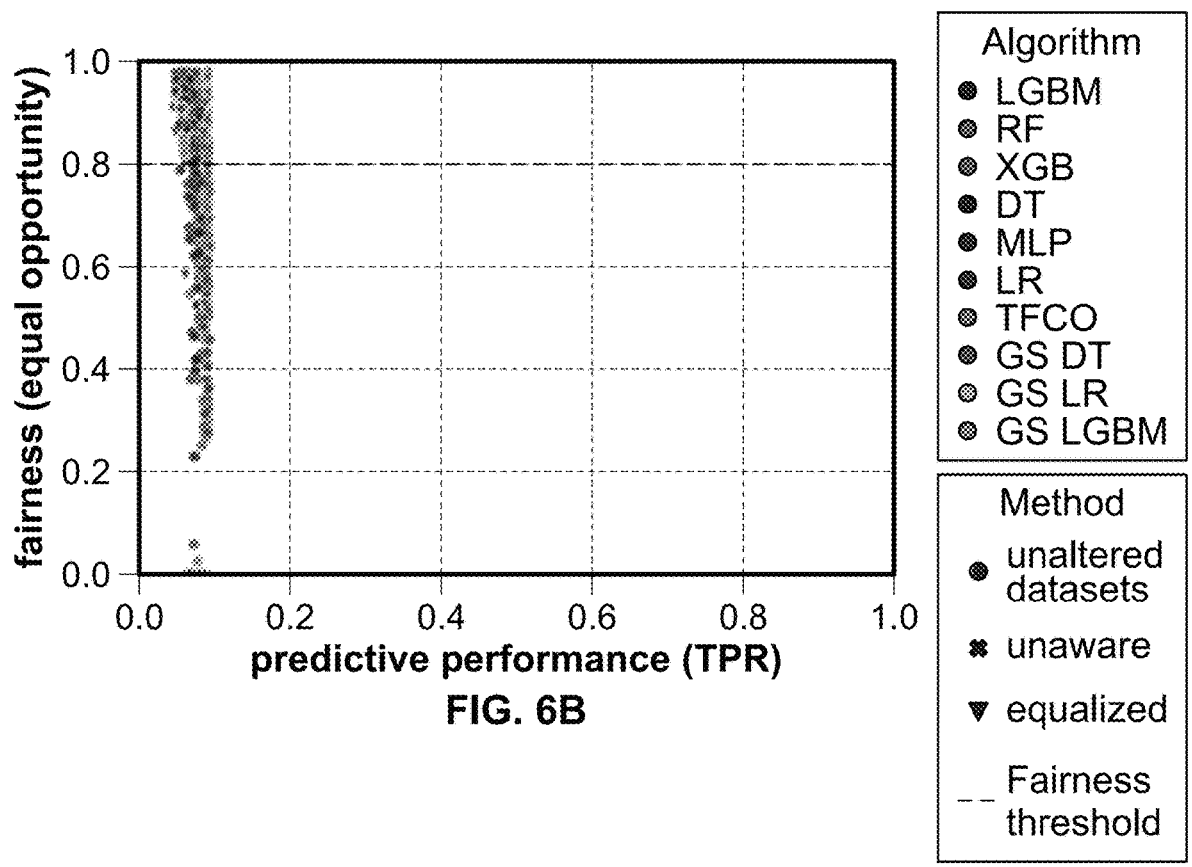
FIG. 6B shows a graphical representation of a Donors Choose dataset models performance for the top 5% predicted positives according to an embodiment.

FIG. 6B shows a graphical representation of a Donors Choose dataset models performance for the top 5% predicted positives.

In one aspect, the disclosed benchmark suite improves fairness evaluation by bridging the gap between fairness evaluation in the literature and that of real-world ML projects.

In order to mimic real-world ML model deployment scenarios, datasets that are large enough to train state-of-the-art neural network-based models and that encode diverse types of bias inducing patterns were used.

One of the advantages of the disclosed techniques is evaluating ML fairness under different biased patterns in the data, and understanding which types of data bias a given Fair ML (or fairness blind) algorithm is capable of tackling.

Figure 7:
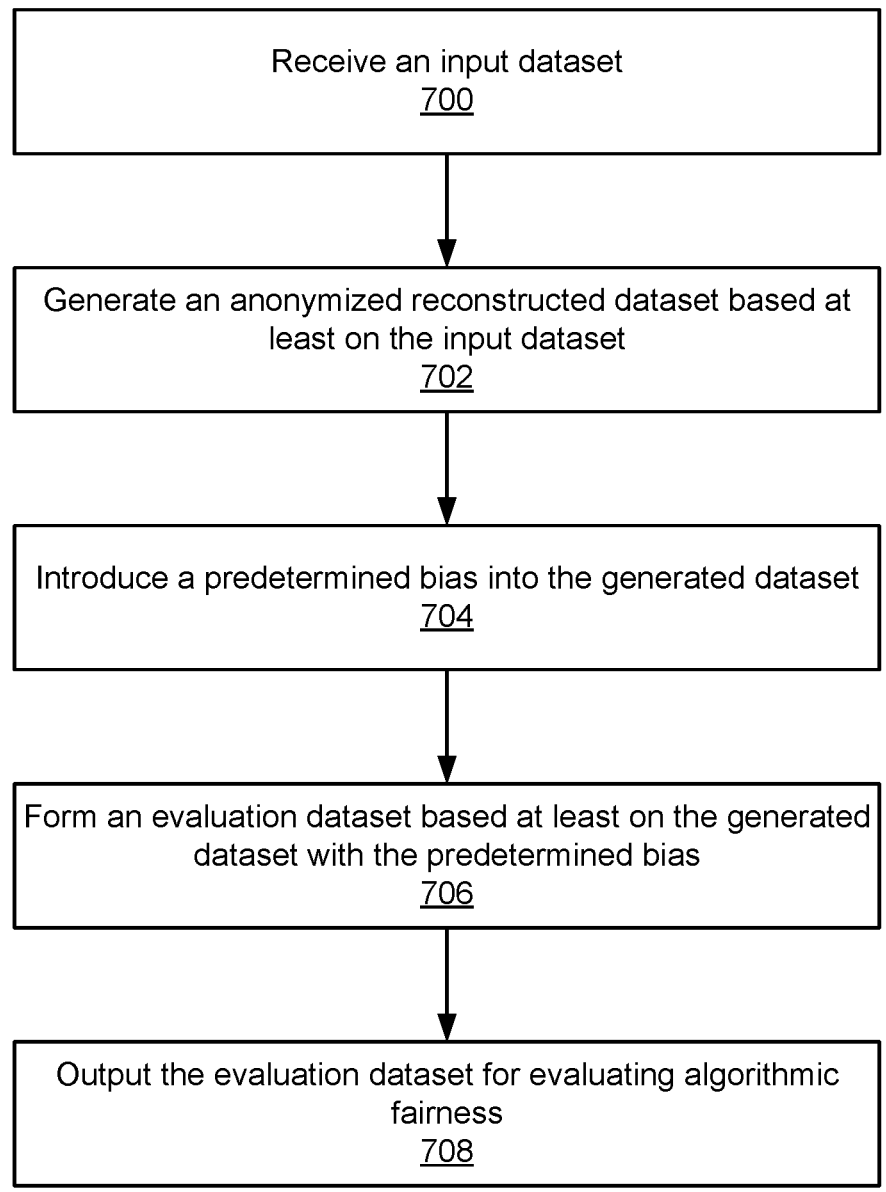
FIG. 7 is a flowchart illustrating an embodiment of a process for obtaining a generated dataset with a predetermined bias for evaluating algorithmic fairness of a machine learning model.

FIG. 7 is a flowchart illustrating an embodiment of a process for obtaining a generated dataset with a predetermined bias for evaluating algorithmic fairness of a machine learning model. The process may be performed by a system or processor such as the one shown in FIG. 1A or 1B.

The process begins by receiving a dataset (700). The dataset may be any type of format such as graphical, tabular, or some other format. In various embodiments, the dataset is in tabular format, having rows and columns. A row corresponds to a dataset record and a column corresponds to a dataset attribute. As further described herein, one or more columns may be appended to the dataset to introduce a predetermined bias into the generated dataset.

In an embodiment, the dataset is processed to generate features and/or to anonymize the data. For example, a dataset with anonymized features may be generated based on the seed dataset received at 700. Since the processing to generate features and/or anonymizing may be performed prior to processing by a machine learning model it is also sometimes referred to as "pre-processing." An example of pre-processing is described with respect to 102.

The process generates an anonymized reconstructed dataset based at least on the received dataset (702). In an embodiment, a dataset generator such as 152 generates the dataset using the dataset received at 700. For example, a rule-based sampler samples a machine learning model (e.g., a generative adversarial network GAN or variant such as a CTGAN). An example of how a GAN is generated is described with respect to 104. In an embodiment, the process produces a synthetic dataset with domain constraints by using the rule-based sampler to sample the seed dataset (e.g., 110 of FIG. 1B) or dataset with anonymized features (e.g., 112 of FIG. 1B).

For example, the process builds a dataset by randomly sampling the GAN and transforming the synthetic data to ensure several domain constraints, such as value ranges, that are otherwise not captured by the model. In an embodiment, the process applies one or more filters to discard instances that are invalid. For example, synthetic instances with negative values on count-based features are invalid, because they may only take positive integer values. Another type of invalid instance may be a repeated instance, causing repeated instances within the generated dataset or the original dataset to be removed. Filtering may also be performed to enforce privacy constraints so that records cannot be traced back to the original dataset.

The process may sample to create a specific type of bias in the dataset. The resultant dataset is referred to as a synthetic biased dataset (e.g., 118 of FIG. 1B). Various dataset variations that have different types of bias can be built using the dataset. An example of sampling using a rule-based sampler is described with respect to 120.

The process introduces a predetermined bias into the generated dataset (704). As described herein, the predetermined bias can be introduced during training and/or by appending/selecting columns to the dataset. An example of introducing bias during training is described with respect to FIG. 4. An example of introducing bias by appending or selecting columns is described with respect to FIG. 1B.

The process forms an evaluation dataset based at least on the generated dataset with the predetermined bias (706). As described herein, the evaluation dataset may have a predetermined type of bias defined by a user or otherwise have domain constraints that make it suitable for testing algorithmic fairness.

The process outputs the evaluation dataset for evaluating algorithmic fairness (708). An example of an evaluation dataset is evaluation dataset 158 and synthetic biased dataset 118. The dataset can be used to evaluate the performance of machine learning models with respect to fairness and robustness to various bias patterns as further described herein.

Flow diagrams of particular embodiments of the presently disclosed methods are depicted in figures. The flow diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the systems described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The term "comprising" whenever used in this document is intended to indicate the presence of stated features, integers, steps, components, but not to preclude the presence or addition of one or more other features, integers, steps, components, or groups thereof.

The disclosure should not be seen in any way restricted to the embodiments described and a person with ordinary skill in the art will foresee many possibilities to modifications thereof. The above-described embodiments are combinable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an input dataset;
   generating an anonymized reconstructed dataset based at least on the input dataset wherein the generated dataset includes tabular data;
   introducing a predetermined bias into the generated dataset while training a generative adversarial network (GAN) model, wherein:
      the generative adversarial network model is configured to append one or more columns to the generated dataset, the one or more columns including at least one dataset attribute or attribute of interest for fairness evaluation; and
      a generative adversarial network sampler is configured to randomly sample the generated dataset appended with the one or more columns;
   forming an evaluation dataset based at least on the generated dataset with the predetermined bias; and
   outputting the evaluation dataset for evaluating algorithmic fairness.

2. The method of claim 1, wherein a column corresponding to an attribute of interest for fairness evaluation includes an attribute including a first label for a majority group and a second label for a minority group.

3. The method of claim 2, wherein the evaluation dataset is applied to evaluate testing group size disparity by being formed such that the majority group has a larger number of records than the minority group.

4. The method of claim 2, wherein the evaluation dataset is applied to evaluate prevalence disparity by being formed such that prevalence with respect to a binary classification task of the majority group and prevalence with respect to a binary classification task of the minority group are disparate.

5. The method of claim 2, wherein the evaluation dataset is applied to evaluate conditional class separability disparity by being formed such that predictive performance, including true positive rate, with respect to a binary classification task is disparate between the majority group and the minority group.

6. The method of claim 5, wherein:
   the conditional class separability disparity is introduced by selecting or adding at least one reference column sampled from a plurality of multivariate normal distributions, each distribution in the plurality of multivariate normal distributions being for a combination of group label and classification task label; and
   the classification task is linearly separable with adjustable true-positive-rate and false-positive-rate for the majority and minority groups determined by the attribute of interest for fairness evaluation.

7. The method of claim 6, wherein the predetermined bias is introduced while training a generative model including by adapting a value function of the generative model during training.

8. The method of claim 7, wherein the generative model includes the generative adversarial network (GAN) model.

9. The method of claim 8, wherein the GAN includes a tabular-data modeling conditional generative adversarial network (CTGAN).

10. The method of claim 1, wherein the generated dataset is used to test a machine learning model for algorithmic fairness.

11. A method, comprising:
    receiving an input dataset;
    generating an anonymized reconstructed dataset based at least on the input dataset, wherein the generated dataset includes tabular data;
    introducing a predetermined bias into the generated dataset while training a generative adversarial network (GAN) model, wherein:
       the generative adversarial network model is configured to select one or more columns from the generated dataset as a dataset attribute or attribute of interest for fairness evaluation; and
       a generative adversarial network sampler is configured to sample the generated dataset according to a predetermined distribution of the selected one or more columns;
    forming an evaluation dataset based at least on the generated dataset with the predetermined bias; and
    outputting the evaluation dataset for evaluating algorithmic fairness.

12. The method of claim 11, wherein a column corresponding to an attribute of interest for fairness evaluation includes an attribute including a first label for a majority group and a second label for a minority group.

13. The method of claim 12, wherein the evaluation dataset is applied to evaluate testing group size disparity by being formed such that the majority group has a larger number of records than the minority group.

14. The method of claim 12, wherein the evaluation dataset is applied to evaluate prevalence disparity by being formed such that prevalence with respect to a binary classification task of the majority group and prevalence with respect to a binary classification task of the minority group are disparate.

15. The method of claim 12, wherein the evaluation dataset is applied to evaluate conditional class separability disparity by being formed such that predictive performance, including true positive rate, with respect to a binary classification task is disparate between the majority group and the minority group.

16. The method of claim 15, wherein:
    the conditional class separability disparity is introduced by selecting or adding at least one reference column sampled from a plurality of multivariate normal distributions, each distribution in the plurality of multivariate normal distributions being for a combination of group label and classification task label; and
    the classification task is linearly separable with adjustable true-positive-rate and false-positive-rate for the majority and minority groups determined by the attribute of interest for fairness evaluation.

17. The method of claim 16, wherein:
    the predetermined bias is introduced while training a generative model including by adapting a value function of the generative model during training; and
    the generative model includes the generative adversarial network (GAN) model.

18. The method of claim 11, wherein the GAN includes a tabular-data modeling conditional generative adversarial network (CTGAN).

19. The method of claim 11, wherein the generated dataset is used to test a machine learning model for algorithmic fairness.

20. A system, comprising:
a processor configured to:
- receive an input dataset;
- generate an anonymized reconstructed dataset based at least on the input dataset, wherein the generated dataset includes tabular data;
- introduce a predetermined bias into the generated dataset while training a generative adversarial network (GAN) model, including by at least one of:
  - appending one or more columns to the generated dataset, wherein the one or more columns includes at least one dataset attribute or attribute of interest for fairness evaluation; or
  - selecting one or more columns from the generated dataset as a dataset attribute or attribute of interest for fairness evaluation;
- form an evaluation dataset based at least on the generated dataset with the predetermined bias; and
- output the evaluation dataset for evaluating algorithmic fairness; and a memory coupled to the processor and configured to provide the processor with instructions.

* * * * *